(12) United States Patent
Waters

(10) Patent No.: US 8,875,870 B2
(45) Date of Patent: Nov. 4, 2014

(54) CONVEYOR BELT CLEANER SCRAPER BLADE AND ASSEMBLY

(75) Inventor: Andrew John Waters, Oswego, IL (US)

(73) Assignee: Benetech, Inc., Aurora, IL (US)

( * ) Notice: Subject to any disclaimer, the term of this patent is extended or adjusted under 35 U.S.C. 154(b) by 229 days.

(21) Appl. No.: 13/077,602

(22) Filed: Mar. 31, 2011

(65) Prior Publication Data

US 2012/0247922 A1   Oct. 4, 2012

(51) Int. Cl.
*B65G 45/12*   (2006.01)
*B65G 45/16*   (2006.01)

(52) U.S. Cl.
CPC ............... *B65G 45/12* (2013.01); *B65G 45/16* (2013.01)
USPC .......................................... 198/497; 198/499

(58) Field of Classification Search
USPC ................................................. 198/497, 499
See application file for complete search history.

(56) References Cited

U.S. PATENT DOCUMENTS

| | | |
|---|---|---|
| 4,359,150 A | 11/1982 | Bowman et al. |
| 4,586,600 A | 5/1986 | Lindbeck |
| 4,598,823 A | 7/1986 | Swinderman |
| 4,643,293 A | 2/1987 | Swinderman |
| 4,658,949 A | 4/1987 | Reicks |
| 4,917,231 A | 4/1990 | Swinderman |
| 4,944,386 A | 7/1990 | Swinderman |
| 4,962,845 A | 10/1990 | Gibbs |
| 5,011,002 A | 4/1991 | Gibbs |
| 5,016,746 A | 5/1991 | Gibbs |
| 5,088,173 A | 2/1992 | Kromer et al. |
| 5,201,402 A | 4/1993 | Mott |
| 5,310,042 A | 5/1994 | Veenhof |
| 5,314,309 A | 5/1994 | Blakeley et al. |
| D347,918 S | 6/1994 | Gibbs |
| 5,413,208 A | 5/1995 | Veenhof |
| 5,447,411 A | 9/1995 | Curley et al. |
| 5,647,476 A | 7/1997 | Veenhof |
| 5,725,083 A | 3/1998 | Archer |
| 5,797,477 A | 8/1998 | Veenhof |

(Continued)

FOREIGN PATENT DOCUMENTS

| | | |
|---|---|---|
| DE | 19508090 A1 | 9/1996 |
| JP | 2009-511382 A | 3/2009 |
| WO | 2007043944 A1 | 4/2007 |

OTHER PUBLICATIONS

Korean Intellectual Property Office, Acting as International Searching Authority, International Search Report for Benetech, Inc. PCT Application No. PCT/US2012/031230 mailed Oct. 10, 2012.

*Primary Examiner* — Leslie A Nicholson, III
(74) *Attorney, Agent, or Firm* — Ungaretti & Harris LLP

(57) ABSTRACT

A replaceable conveyor scraping blade has a blade body extending lengthwise along a longitudinal axis. The blade body is produced from a material having a flexible, elastic quality. The blade body comprises a base portion, and intermediate portion, and a terminal end. The base portion is attachable to a tensioning device for biasing the blade body against a conveyor belt. The intermediate portion is generally arcuate and comprises a leading surface and a trailing surface. The leading surface extends upwardly relative to the base portion. The trailing surface is opposite the leading surface. It also extends upwardly relative to the base portion and has a scalloped surface when viewed in cross-section extending lengthwise along the longitudinal axis. The terminal end has a scraping surface separating an uppermost portion of the trailing surface from an uppermost portion of the leading surface.

20 Claims, 11 Drawing Sheets

(56) References Cited

U.S. PATENT DOCUMENTS

| | | | | |
|---|---|---|---|---|
| 5,979,638 A | * | 11/1999 | Wiggins | 198/497 |
| 5,992,614 A | | 11/1999 | Mott | |
| 6,003,657 A | | 12/1999 | Mott | |
| 6,056,112 A | | 5/2000 | Wiggins | |
| 6,152,290 A | | 11/2000 | Mott et al. | |
| 6,182,816 B1 | | 2/2001 | Gibbs et al. | |
| 6,227,350 B1 | * | 5/2001 | Yoshizako et al. | 198/499 |
| 6,241,078 B1 | | 6/2001 | Mott | |
| 6,254,156 B1 | | 7/2001 | Sherwin et al. | |
| 6,279,727 B1 | | 8/2001 | Waalkes et al. | |
| 6,290,276 B1 | | 9/2001 | Sherwin | |
| 6,315,105 B1 | | 11/2001 | Gibbs et al. | |
| 6,349,816 B1 | * | 2/2002 | Tenzer et al. | 198/497 |
| 6,354,428 B1 | | 3/2002 | Gibbs et al. | |
| 6,374,990 B1 | | 4/2002 | Swinderman | |
| 6,374,991 B1 | | 4/2002 | Swinderman | |
| 6,401,911 B1 | | 6/2002 | Swinderman | |
| 6,439,373 B1 | * | 8/2002 | Swinderman | 198/499 |
| 6,443,294 B1 | | 9/2002 | Brody et al. | |
| 6,457,575 B2 | | 10/2002 | Swinderman | |
| 6,575,292 B2 | | 6/2003 | Swinderman | |
| 6,591,969 B2 | | 7/2003 | Swinderman et al. | |
| 6,612,419 B1 | | 9/2003 | Watson | |
| D482,508 S | | 11/2003 | DeVries | |
| 6,644,463 B2 | | 11/2003 | Mott | |
| 6,813,834 B2 | | 11/2004 | Anderson | |
| 6,823,983 B2 | | 11/2004 | DeVries | |
| 6,837,129 B2 | | 1/2005 | Martin | |
| 6,874,616 B2 | | 4/2005 | DeVries et al. | |
| 6,883,806 B2 | | 4/2005 | Guzzardo | |
| 6,910,278 B2 | | 6/2005 | Holder | |
| 6,926,133 B2 | | 8/2005 | Kolodziej et al. | |
| 6,948,609 B2 | | 9/2005 | Finger et al. | |
| 6,968,940 B2 | | 11/2005 | Wiggins | |
| 6,986,418 B2 | | 1/2006 | Swinderman et al. | |
| 7,007,794 B2 | | 3/2006 | Waters et al. | |
| 7,082,686 B2 | | 8/2006 | Anderson | |
| 7,083,040 B2 | | 8/2006 | Finger et al. | |
| 7,093,706 B2 | | 8/2006 | DeVries et al. | |
| 7,131,525 B2 | | 11/2006 | Swinderman et al. | |
| D543,670 S | | 5/2007 | Swinderman | |
| 7,216,756 B2 | | 5/2007 | Swinderman | |
| D547,523 S | | 7/2007 | Swinderman | |
| 7,308,980 B2 | | 12/2007 | Peterson et al. | |
| 7,347,315 B2 | | 3/2008 | Kolodziel et al. | |
| 7,367,443 B2 | | 5/2008 | Swinderman | |
| 7,370,750 B2 | | 5/2008 | Swinderman | |
| 7,404,421 B2 | | 7/2008 | Guels | |
| 7,424,945 B2 | | 9/2008 | Swinderman | |
| 7,428,960 B2 | | 9/2008 | Hall | |
| 7,441,647 B2 | | 10/2008 | Wiggins et al. | |
| 7,461,736 B2 | | 12/2008 | Waters et al. | |
| 7,472,784 B2 | | 1/2009 | Swinderman et al. | |
| 7,690,120 B2 | | 4/2010 | Sieke et al. | |
| 7,775,341 B2 | | 8/2010 | Swinderman et al. | |
| 7,798,310 B2 | | 9/2010 | Veenhof | |
| 2003/0057659 A1 | | 3/2003 | Guzzardo | |
| 2003/0066737 A1 | * | 4/2003 | Malmberg | 198/497 |
| 2004/0148793 A1 | | 8/2004 | Holder | |
| 2004/0188224 A1 | | 9/2004 | Kolodziej et al. | |
| 2005/0126889 A1 | * | 6/2005 | Wiggins | 198/497 |
| 2005/0210684 A1 | | 9/2005 | Newman | |
| 2005/0220500 A1 | | 10/2005 | DiGirolamo et al. | |
| 2005/0245334 A1 | | 11/2005 | Dehen | |
| 2005/0247543 A1 | | 11/2005 | DeVries et al. | |
| 2006/0021854 A1 | * | 2/2006 | Waters et al. | 198/497 |
| 2006/0021855 A1 | | 2/2006 | Kolodziej et al. | |
| 2006/0032057 A1 | | 2/2006 | Sieke et al. | |
| 2006/0039790 A1 | | 2/2006 | Hartmann et al. | |
| 2006/0112799 A1 | | 6/2006 | Hambleton et al. | |
| 2006/0131135 A1 | | 6/2006 | Waters et al. | |
| 2006/0151064 A1 | | 7/2006 | Guels | |
| 2006/0194526 A1 | | 8/2006 | Bolz et al. | |
| 2006/0246825 A1 | | 11/2006 | Bolz et al. | |
| 2007/0029169 A1 | | 2/2007 | Swinderman et al. | |
| 2007/0034480 A1 | | 2/2007 | Swinderman et al. | |
| 2007/0089968 A1 | | 4/2007 | Swinderman | |
| 2007/0137984 A1 | | 6/2007 | Veenhof | |
| 2007/0172535 A1 | | 7/2007 | Fridley et al. | |
| 2007/0283578 A1 | | 12/2007 | Newman | |
| 2008/0029193 A1 | | 2/2008 | Perrin et al. | |
| 2008/0039880 A1 | | 2/2008 | Nohilly et al. | |
| 2008/0179168 A1 | | 7/2008 | Swinderman | |
| 2008/0264231 A1 | | 10/2008 | Coe et al. | |
| 2009/0016889 A1 | | 1/2009 | Krutzfeldt et al. | |
| 2009/0169273 A1 | | 7/2009 | Anderson et al. | |
| 2009/0221214 A1 | | 9/2009 | Martin | |
| 2009/0324421 A1 | | 12/2009 | Ahmad et al. | |
| 2010/0104444 A1 | | 4/2010 | Garcia Andujar et al. | |
| 2010/0116621 A1 | | 5/2010 | DeVries | |
| 2010/0126832 A1 | | 5/2010 | DeVries | |
| 2010/0201088 A1 | | 8/2010 | Newman et al. | |
| 2010/0209248 A1 | | 8/2010 | Volanthen et al. | |
| 2010/0254812 A1 | | 10/2010 | Reitz | |
| 2011/0067197 A1 | | 3/2011 | Mott et al. | |
| 2011/0220461 A1 | * | 9/2011 | Kirschner et al. | 198/499 |
| 2012/0160634 A1 | * | 6/2012 | Zieger | 198/497 |

* cited by examiner

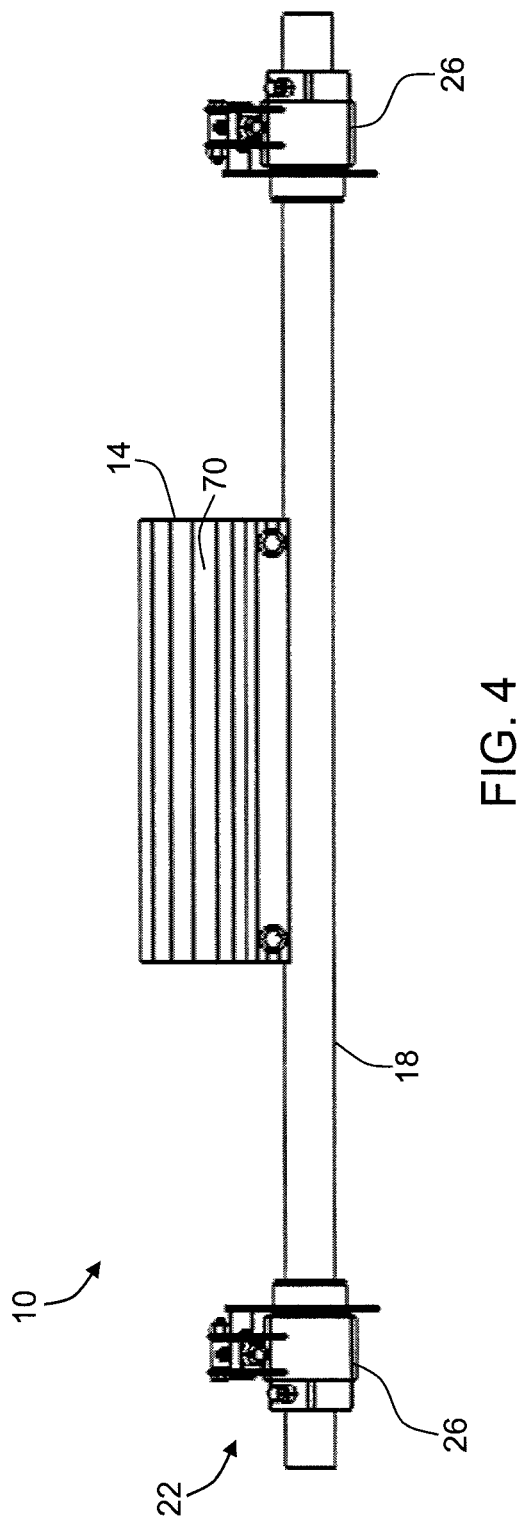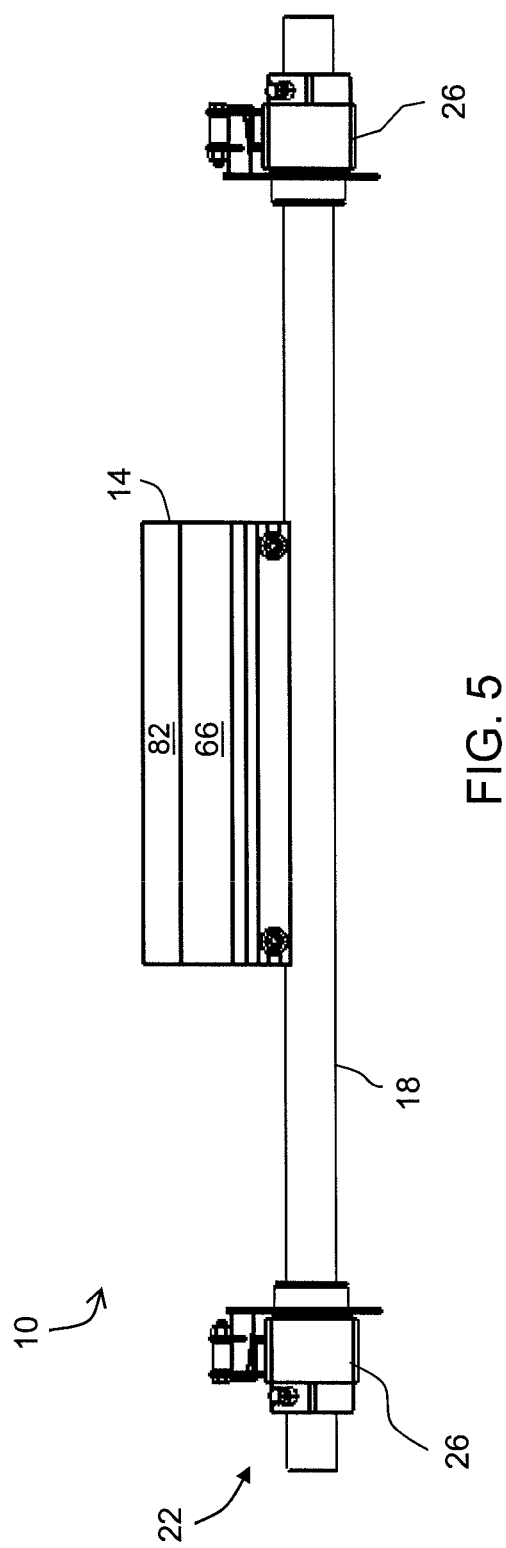

CONVEYOR BELT CLEANER SCRAPER BLADE AND ASSEMBLY

CROSS-REFERENCE TO RELATED APPLICATIONS

N/A

FEDERALLY SPONSORED RESEARCH OR DEVELOPMENT

N/A

TECHNICAL FIELD

The invention relates to conveyor belt cleaning systems. More particularly, the present invention is directed to an improved conveyor belt scraper blade and assembly.

BACKGROUND OF THE INVENTION

In the art of mining, conveyor belts are used to receive, transport, and deliver mined substances such as coal, ore, and the like from one location to another. For example, conveyor belts may be used to carry mined material out of a mine and deliver it to a location external to the mine such as a holding area or transport vehicle. Conveyor belts may also be employed for carrying materials between processes. These belts can be extremely long and can move the material at high linear speeds.

Typically, driving mechanisms such as motorized wheels or pulleys are used to transfer movement to the conveyor belts. Generally, one driving mechanism is located at an entry end of the conveyor belt where material are received onto the belt and another driving mechanism is located at a delivery end of the belt where the mined material is deposited from the belt to an external location. One of the driving mechanisms may be free-wheeling if the appropriate to the specific use.

During the transfer process, it is not uncommon for mined material residue to adhere, cling, or remain on the belt as the belt makes its return to the entry end from the delivery end, subsequent to the bulk of the transported material being deposited from the belt.

The process is somewhat complicated in high dust applications such as coal mining because the liquid is often used to suppress dust. The liquid causes increased residue to build on the conveyor belt. This material can transfer to and build up on pulleys, rollers, idlers, and bearings. This build up of material causes excessive wear at a minimum and can cause seizing in bearings and may lead to fires, a catastrophic result. The mined material can have huge fluctuations on moisture content (% water), and water is often added to the coal during the mining/handling processes.

Belt scrapers are often employed to remove this material from the conveyor belts to prevent the transfer to other elements of the conveying system, thereby preventing damage to those elements. Scraper blades are attached to a tensioner unit which is used to maintain contact between the scraper blades and the belt, typically at delivery end wheel or on the return run of the belt. The dynamic nature of the environment and the abrasive nature of the materials being carried by the endless belt require belt scrapers that are durable and that can be maintained in contact with the belt with consistent pressure. The belt scrapers are expendable elements of the system and any economy that can be achieved with the belt scrapers is an improvement in the economic efficiency of the system.

The present invention is provided to solve the problems discussed above and other problems, and to provide advantages and aspects not provided by prior conveyor belt cleaner scraper blades and assemblies of this type. A full discussion of the features and advantages of the present invention is deferred to the following detailed description, which proceeds with reference to the accompanying drawings.

SUMMARY OF THE INVENTION

One aspect of the present invention is directed to a replaceable conveyor scraping blade. The blade comprises a blade body which extends lengthwise along a longitudinal axis and is produced from a material having a flexible and/or elastic quality. The blade body comprises a base portion, generally arcuate intermediate portion, and a terminal end. The base portion is attachable to a tensioning device which biases the blade body against a conveyor belt. The intermediate portion comprises a first surface extending upwardly relative to the base portion and a second surface opposite the first surface. The second surface also extends upwardly relative to the base portion and has a scalloped surface when viewed in cross-section extending lengthwise along the longitudinal axis. The terminal end has a scraping surface separating an uppermost portion of the second surface from an uppermost portion of the first surface.

The first aspect of the invention may include one or more of the following features, alone or in any reasonable combination. The uppermost portion of the second surface may be higher than the uppermost portion of the first surface relative to the base portion. The scalloped surface may comprise a plurality of convex and concave sub-surfaces. Each convex sub-surface may extend lengthwise along the longitudinal axis. Each concave sub-surface may extend lengthwise along the longitudinal axis. Each concave sub-surface may be separated from an adjacent concave sub-surface by a convex sub-surface. The first surface may be arcuately shaped. The scraping surface may be angled greater than 0° from a vertical axis passing through an edge point at which the scraping surface and the second surface intersect. The intermediate portion may further comprise a neck having a reduced width to provide a region of reduced resistance to deflection for allowing the terminal end and intermediate portion to deflect about the base portion. The base portion may comprise a slot extending along the longitudinal axis for mounting the replaceable conveyor scraping blade to a tensioner. The slot may be lined with a rigid member. The slot may have a pair of opposing openings forming a substantially T-shaped cross-section. The scalloped surface may comprise a visual level-of-wear indicator.

A second aspect of the present invention is directed to a replaceable conveyor scraping blade. The blade comprises a blade body which comprises a base portion, an intermediate portion, and a terminal end. The blade body extends lengthwise along a longitudinal axis and is produced from a material having a flexible, elastic quality. The base portion is attachable to a tensioning device for biasing the blade body against a conveyor belt. The intermediate portion is generally arcuate and comprises a first surface which extends upwardly relative to the base portion and a generally arcuate second surface opposite the first surface. The second surface also extends upwardly relative to the base portion and has a plurality of outwardly convex surfaces extending lengthwise along the longitudinal axis. Each outwardly convex surface is separated from an adjacent outwardly convex surface by a inwardly concave surface. The terminal end has a scraping surface separating an uppermost portion of the second surface from an uppermost portion of the first surface.

The second aspect of the present invention may include one or more of the following features, alone or in any reasonable combination. The plurality of outwardly convex surfaces and the inwardly concave surface may form a scalloped surface in cross-section. The uppermost portion of the second surface may be elevated higher than the uppermost portion of the first surface relative to the base portion. The first surface may be arcuately shaped. The intermediate portion may further comprise a neck having a reduced width to provide a region of reduced resistance to deflection for allowing the terminal end and intermediate portion to deflect about the base portion.

Another aspect of the present invention is directed to a replaceable conveyor scraping blade. The blade comprises a blade body extending lengthwise along a longitudinal axis and produced from a material having a flexible, elastic quality. The blade body comprises a base portion, an intermediate portion, and a terminal end. The base portion is attachable to a tensioning device for biasing the blade body against a conveyor belt. The intermediate portion is generally arcuate and comprises a first surface and a second surface. The first surface extends upwardly relative to the base portion. The second surface is opposite the first surface and is generally arcuate. The second surface also extends upwardly relative to the base portion and has a plurality of arcuate sub-surfaces extending lengthwise along the longitudinal axis. Each arcuate sub-surface has a height less than a height of the generally arcuate second surface. The terminal end has a scraping surface separating an uppermost portion of the second surface from an uppermost portion of the first surface.

Another aspect of the present invention is directed to a replaceable conveyor scraping blade. The blade comprises a blade body extending lengthwise along a longitudinal axis and produced from a material having a flexible, elastic quality. The blade body comprises a base portion, an intermediate portion, and a terminal end. The base portion is attachable to a tensioning device for biasing the blade body against a conveyor belt. The intermediate portion is generally arcuate and comprises a first surface and a second surface. The first surface extends upwardly relative to the base portion. The second surface is generally arcuate and is located opposite the first surface. The second surface extends upwardly relative to the base portion and has a visual wear-indicator for communicating a level of wear of the scraping blade resulting from frictional engagement with a conveyor belt. The terminal end has a scraping surface separating an uppermost portion of the second surface from an uppermost portion of the first surface.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4 is a back view of the conveyor belt cleaning assembly of FIG. 1;

FIG. 5 is a front view of the conveyor belt cleaning assembly of FIG. 1;

DETAILED DESCRIPTION

Figure 1:
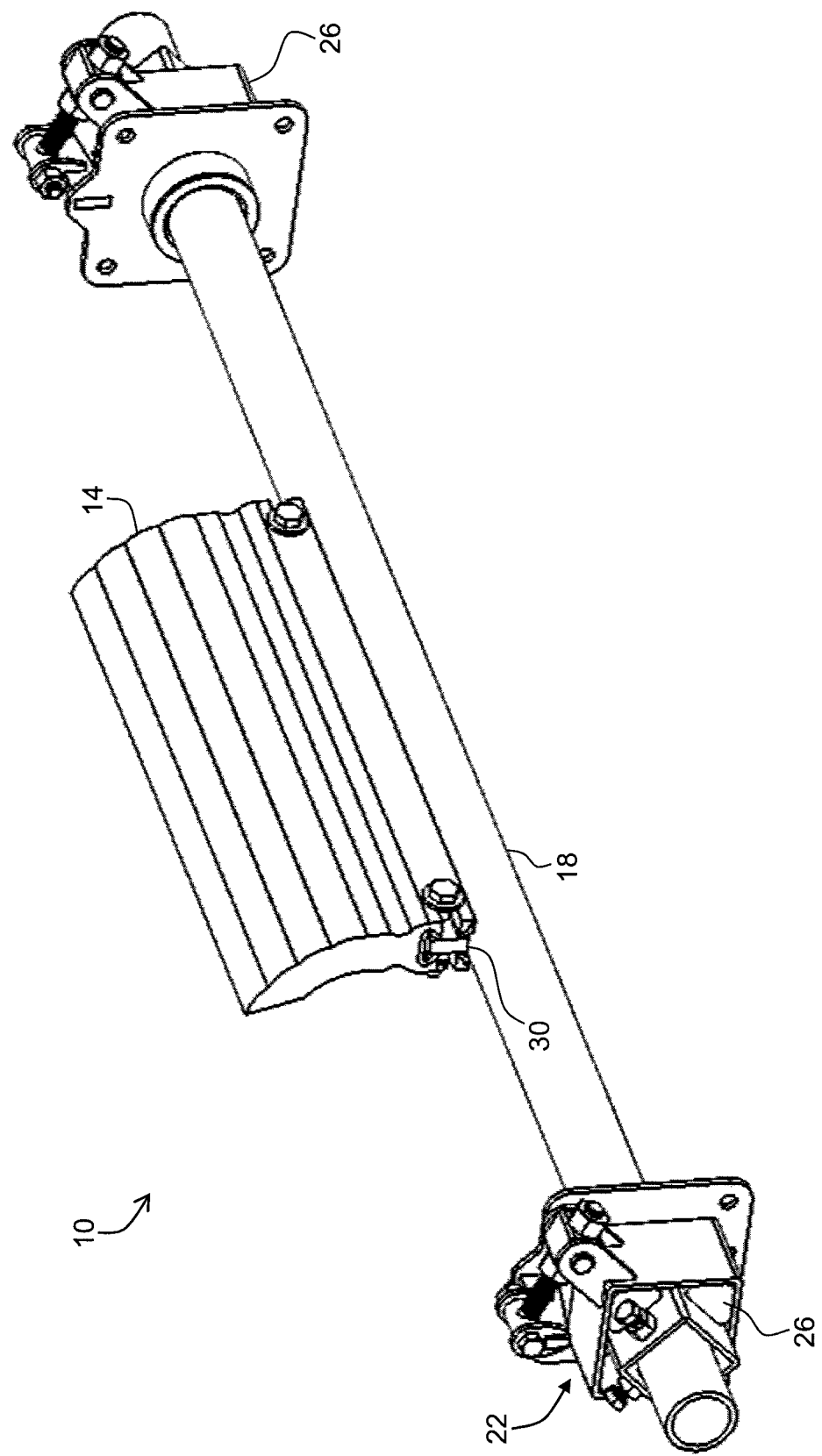
FIG. 1 is a perspective view of a conveyor belt cleaning assembly.
Figure 2:
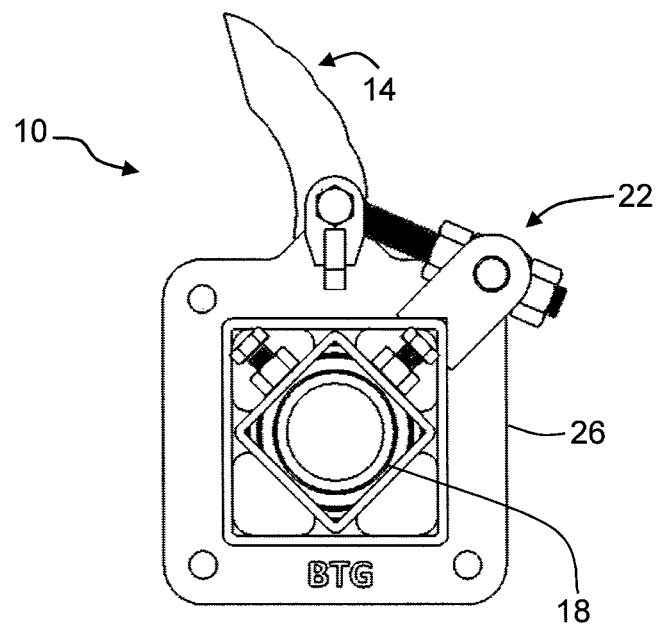
FIG. 2 is a side view of the conveyor belt cleaning assembly of FIG. 1.
Figure 3:
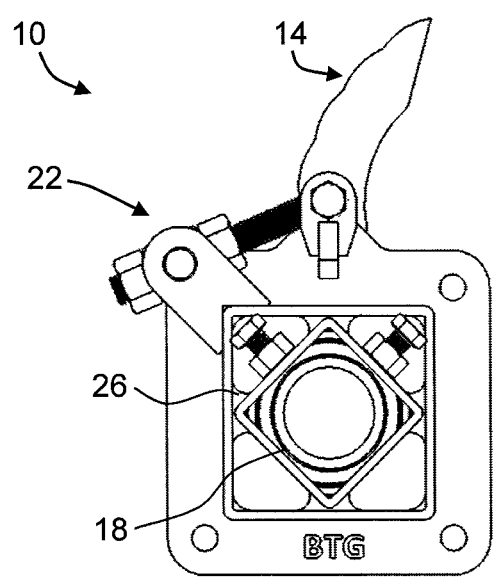
FIG. 3 is an opposite side view of the conveyor belt cleaning assembly of FIG. 1.
Figure 6:
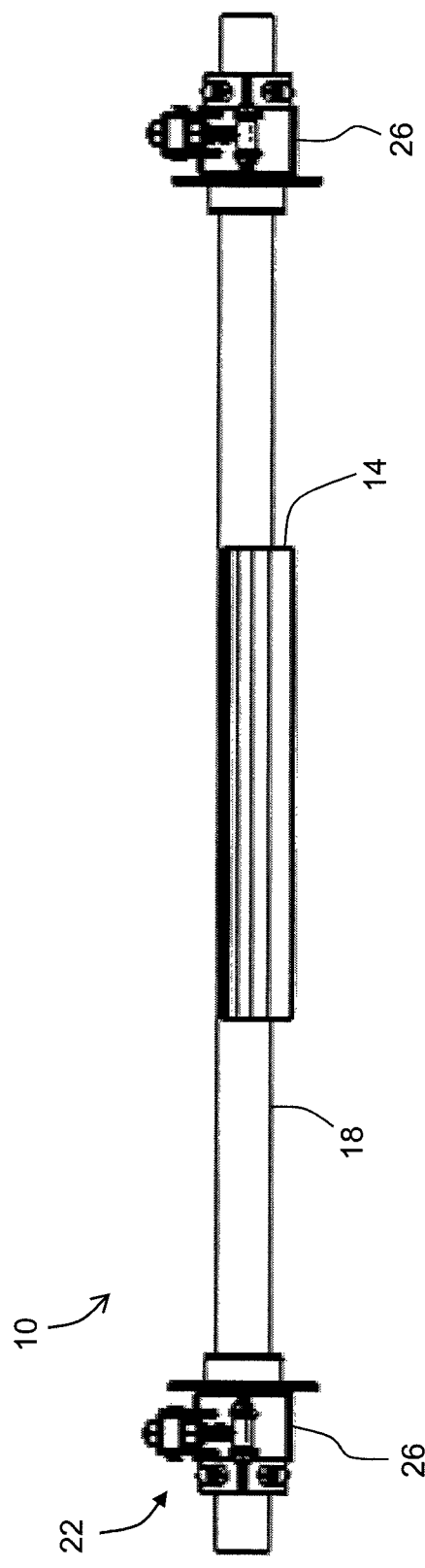
FIG. 6 is a top view of the conveyor belt cleaning assembly of FIG. 1.
Figure 7:
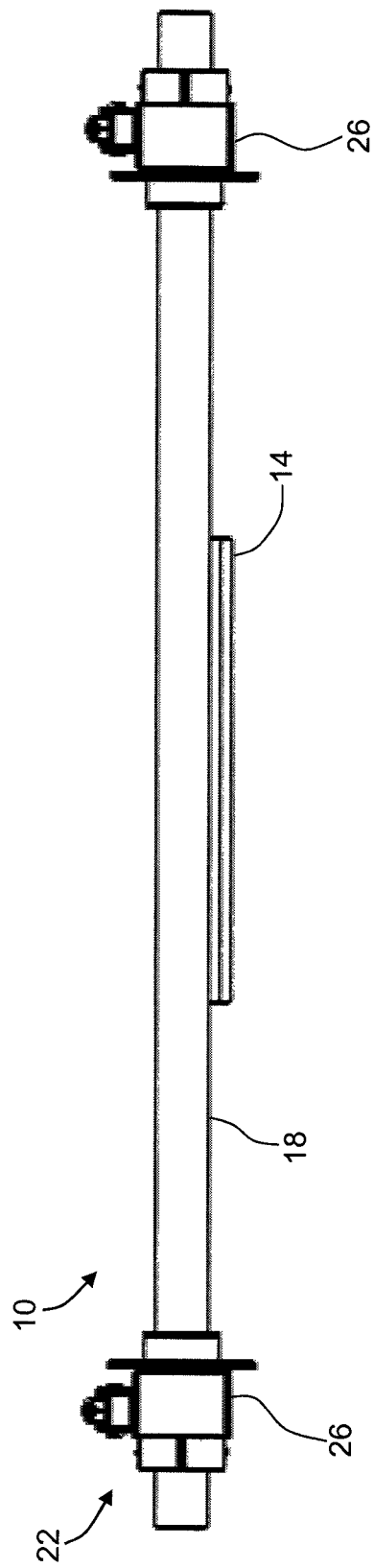
FIG. 7 is a bottom view of the conveyor belt cleaning assembly of FIG. 1.
Figure 8:
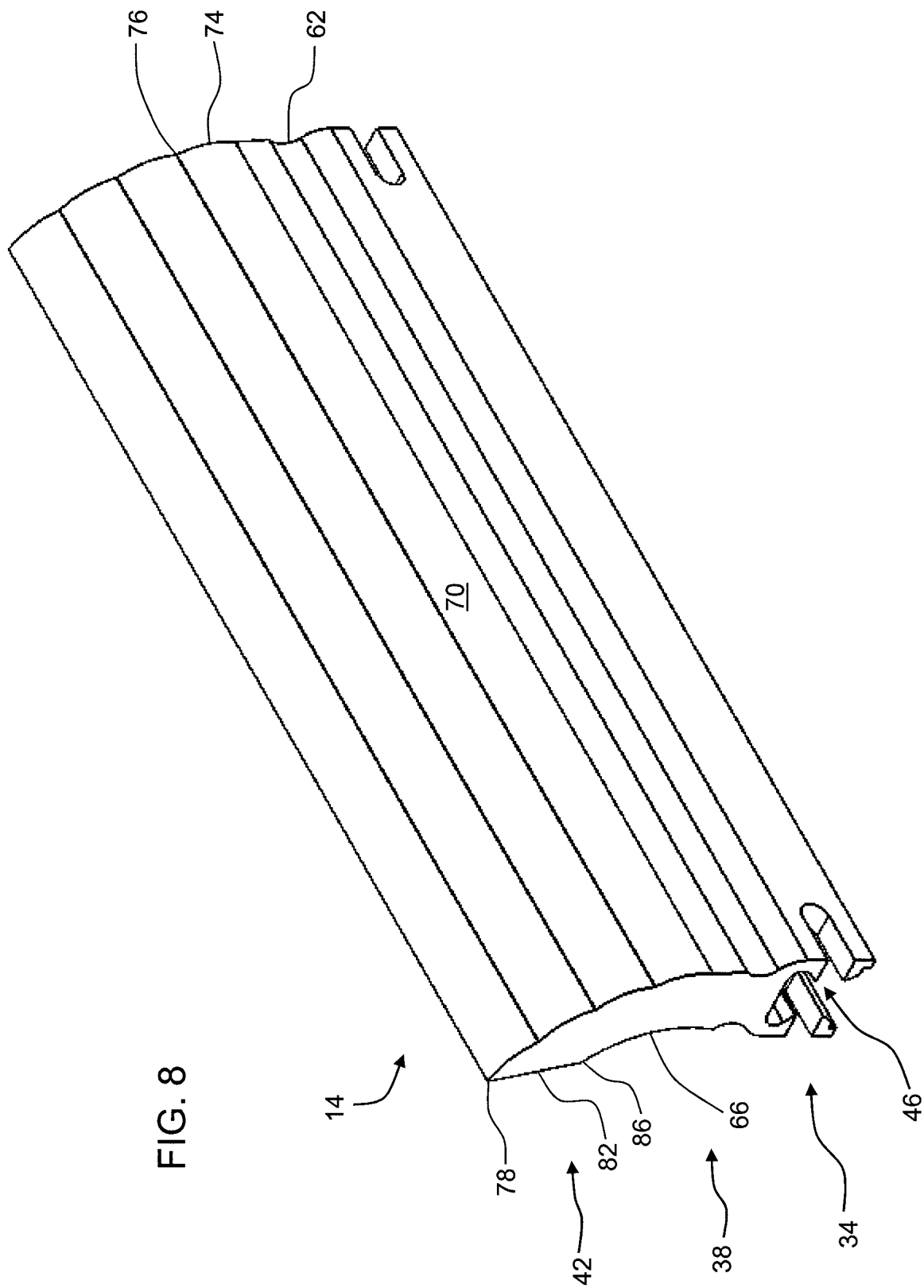
FIG. 8 is a perspective view of a conveyor belt scraper blade.
Figure 9:
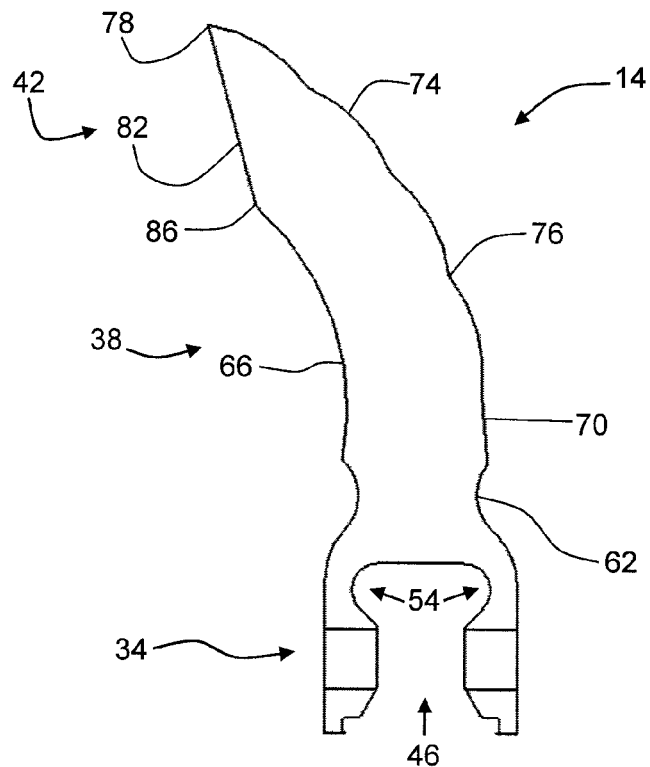
FIG. 9 is a side view of the scraper blade of FIG. 8.
Figure 10:
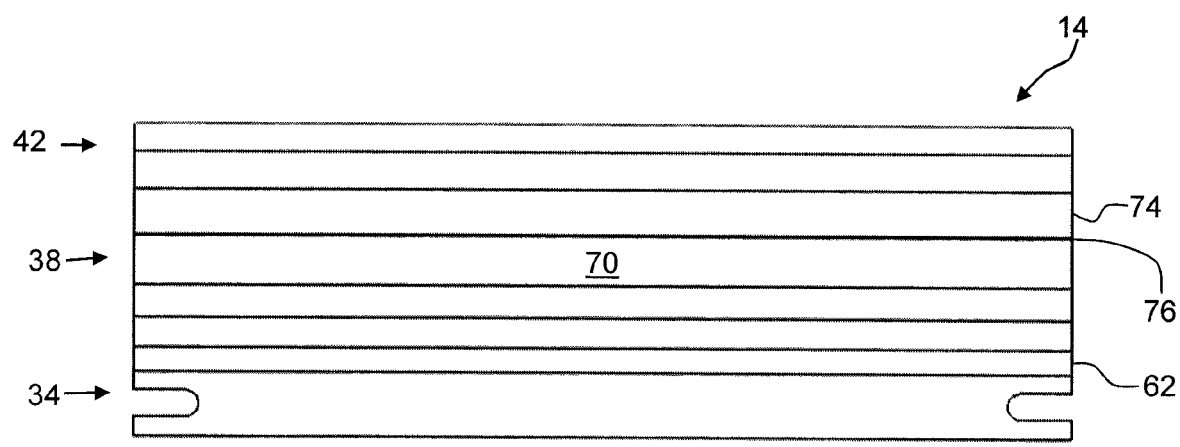
FIG. 10 is a back view of the scraper blade of FIG. 8.
Figure 11:
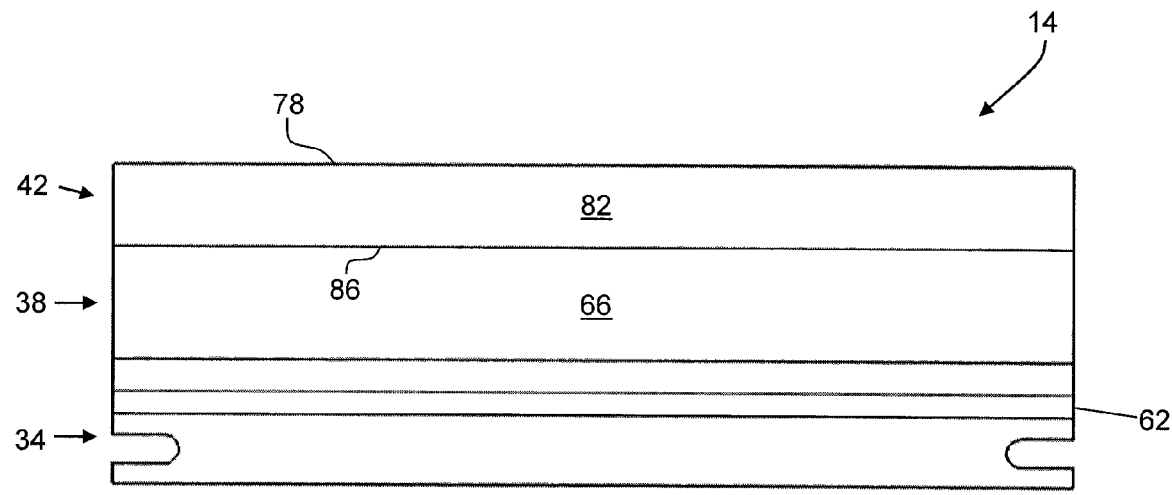
FIG. 11 is a front view of the scraper blade of FIG. 8.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-7, a conveyor belt cleaning assembly 10 of the present invention is illustrated. The assembly 10 includes a scraper blade 14 attached to an elongate shaft 18 that is adapted to be rotatably mounted to a support member at each end and that is adapted to be selectively rotated about an axis 50 running lengthwise through the shaft 18. Rotation or at least partial rotation is controlled by a tensioner 22 having adjustable, spring-loaded biasing units 26 located at opposing ends of the shaft 18 and attached thereto. A mounting member 30 is fixedly attached to the shaft 18 and extends outwardly therefrom, preferably in the form of a fin-like structure extending radially outwardly from the shaft 18. The mounting member 22 has apertures for receiving a fastener, such as a bolt, pin, cotter key, or the like, for attachment with the scraper blade 14.

The scraper blade 14 is removably attached to the mounting member 30 such that the blade 14 extends radially outwardly from the shaft 18. A purpose of the scraper blade 14 is, when biased or spring-loaded against a moving conveyor, the blade 14 frictionally engages the conveyor belt 100 to liberate or free materials adhered to the belt 100. Blade engagement with the belt 100 is illustrated in, for example, FIG. 13.

The scraper blade 14 comprises a blade body which may be manufactured from a polyurethane or rubber of reasonable flexibility and rigidity. The blade 14 may comprise a plurality of substantially identical horizontally aligned segments; however, the blade of the present invention is preferably a unitary member having a length generally shorter than the shaft 18 and a height sufficient to contact a conveyor belt during use while providing a sufficient useful life with a desired amount of deflection. Accordingly, the height of the blade 14 may be varied depending on design parameters and need. It is contemplated that the height of the blade may vary from about 5.0 inches to about 20 inches, a more preferably from about 5.8 inches to about 14.6 inches. The blade 14 is a generally arcuate shape extending upwardly from a base portion 34 through an intermediate portion 38 and terminating at terminal end 42.

Figure 12:
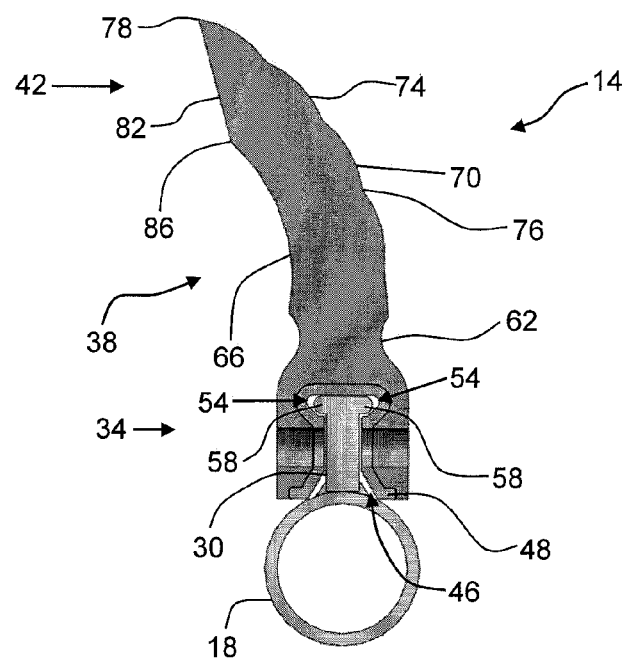
FIG. 12 is a side view of an alternative attachment of a blade of the present invention to a shaft of the present invention.

The base portion 34 is adapted to be removably attached to the mounting member 22. Accordingly, the base portion has a slot 46 for receiving the mounting member 22. The slot 46 is generally defined by an aluminum extrusion 48 imbedded in the base portion 34. In one embodiment, the slot 46 has an additional opening 54 extending outwardly from a main slot portion for receiving a complimentary leg 58 extending outwardly from the mounting member 22. In another embodiment, the slot has a plurality of openings 54 for receiving an equal number of complimentary legs 58 extending outwardly from the mounting member 22. In an embodiment illustrated in FIG. 12, the slot 54 and the openings 54 form a T-shape or mushroom-shape, and the mounting member 22 has an equal number of legs 58 for seating within the openings 54.

The intermediate portion 38 has a lengthwise neck 62 of reduced thickness of the blade material. A front or leading surface 66 may be generally smooth and extends arcuately and upwardly from the neck 62 to the terminal end 42. A rear or trailing surface 70 is opposite the front surface 66 and extends upwardly and arcuately from the neck 62 to the terminal end 42. The rear surface 70 is generally scalloped having a plurality of lengthwise arcuate surfaces 74 a lengthwise scalloped appearance. Each arcuate surface 74 may be substantially formed by an arc of a circle or other suitable conic section when viewed in cross-section. Preferably, each arcuate surface 74 forms an outwardly convex surface which is joined to an adjacent arcuate surface 74 by an inwardly concave surface 76. The rear surface 70 ends at an upper most edge point of the terminal end 42, such that, from the rear view, the terminal end 42 of the blade 14 is no more than a line 78.

The terminal end 42 has a scraping surface 82 extending downwardly from the edge 78 at the uppermost portion of the rear surface 70. The scraping surface 82 is also angled greater than 0° relative to a vertical axis intersecting the edge 78. The scraping surface 82 terminates at a lower edge 86 located at an uppermost portion of the front or leading surface 66 of the blade 14.

Stated another way, a blade 14 of the present invention has a unique blade design. The unique blade design comprises a polyurethane or rubber blade body (a reasonably flexible member) which extends lengthwise along a longitudinal axis and an aluminum extrusion or rigid insert piece for mounting on the cross member or shaft 18. A cross member mounting allows the blade body to be actuated against a conveyor belt 100 and scrape material that adheres to the exterior of the belt 100 in material handling applications. This removes carry-back material from the belt 100. Carry-back material is material that adheres to the belt as it traverses from the carrying side to the return side.

The blade body consists of a base region 34 having an embedded rigid mounting member 48, generally a metallic member, preferably an aluminum extrusion. The embedded rigid mounting member 48 may also be produced from a steel, polymer, plastic, ceramic, or the like. The blade body has a narrowing cross section (the neck 62) near the base region 34 that allows for preferential flexing and bending during operation to minimize differential pressure at the belt contact point, minimizing belt indentation. The blade body has a scalloped outer profile consisting of series of alternating convex and concave segments. The segments provide a visual indication of wear life remaining on the blade 14 because as the blade 14 wears, the friction between the scraping surface 82 and the belt 100 causes removal of the blade body which reduces the number of segments over time. Thus, the upper edge 78 marking the terminal end 42 from the intermediate section 48 on the trailing surface 70 changes over time with use moving downwardly towards the base 34 and decreasing the number of outwardly convex segments and reducing the height of the trailing surface 70. The lower edge 86 may undergo the same movement downwardly towards the base 34 as the blade wears, thus reducing the height of the leading surface 66.

Figure 18:
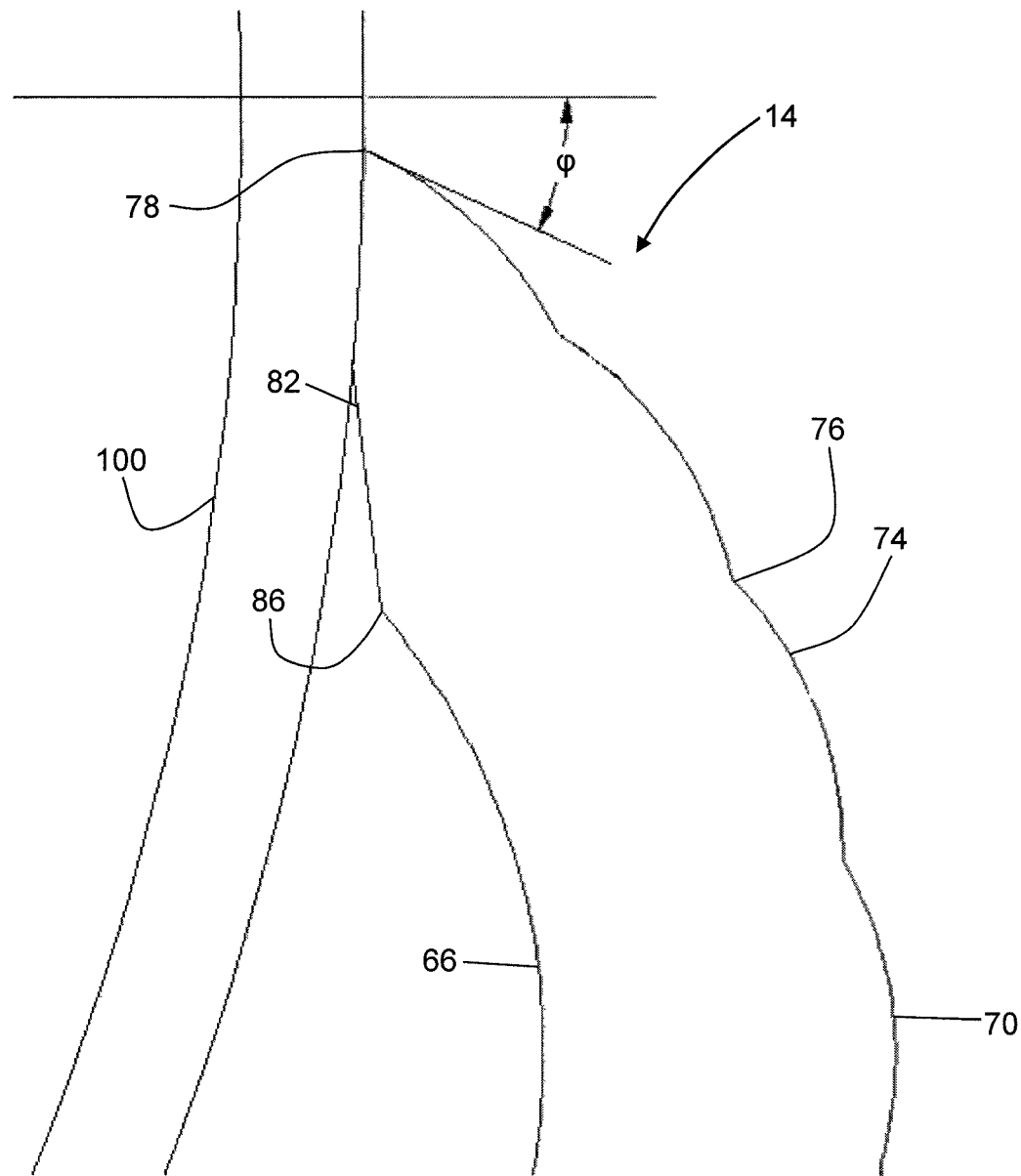
FIG. 18 is a schematic side view of a scraper blade of the present invention showing a cleaning angle of the scraper blade.

The scraping surface 82 has a variable cleaning/contact angle $\phi$. This allows a renewable or variable tip to prevent blade splitting and has a variable cross-section to "smooth out" tensioning variation. The scallops of the scalloped surface, e.g. the alternating convex and concave surfaces or segments, provide a variable area which smoothes out peaks and valleys of mechanical pressure application by giving slight variations in contact across area/cross section. Thus, an important aspect of the invention is a slightly varying cross-sectional width along the height of intermediate portion of the blade and the terminal end as the blade undergoes wear, as it follows that as wear occurs the terminal end migrates downwardly relative to, and at the expense of, the height of the intermediate portion. The scraping surface 82 further has an offset inner profile giving the blade body a reasonably constant cross-section from the scraping surface 82 back to the trailing surface 70 during its usable life. The variable contact angle $\phi$ may be increased over time and is measured from a generally horizontal axis drawn perpendicular to the tangent at the location on the belt where a new blade's upper edge 78 engages the belt 100 when initially placed into service. The angle $\phi$ can be varied from less than 25° to greater than 50°, preferably from 0° to 50°. (See FIG. 18). The scraping surface 82 also has a profiled tip, which is tapered for initial contact against the conveyor belt 100 and allows for gradual wear in that ensures good surface contact is attained and maintained.

Figure 13:
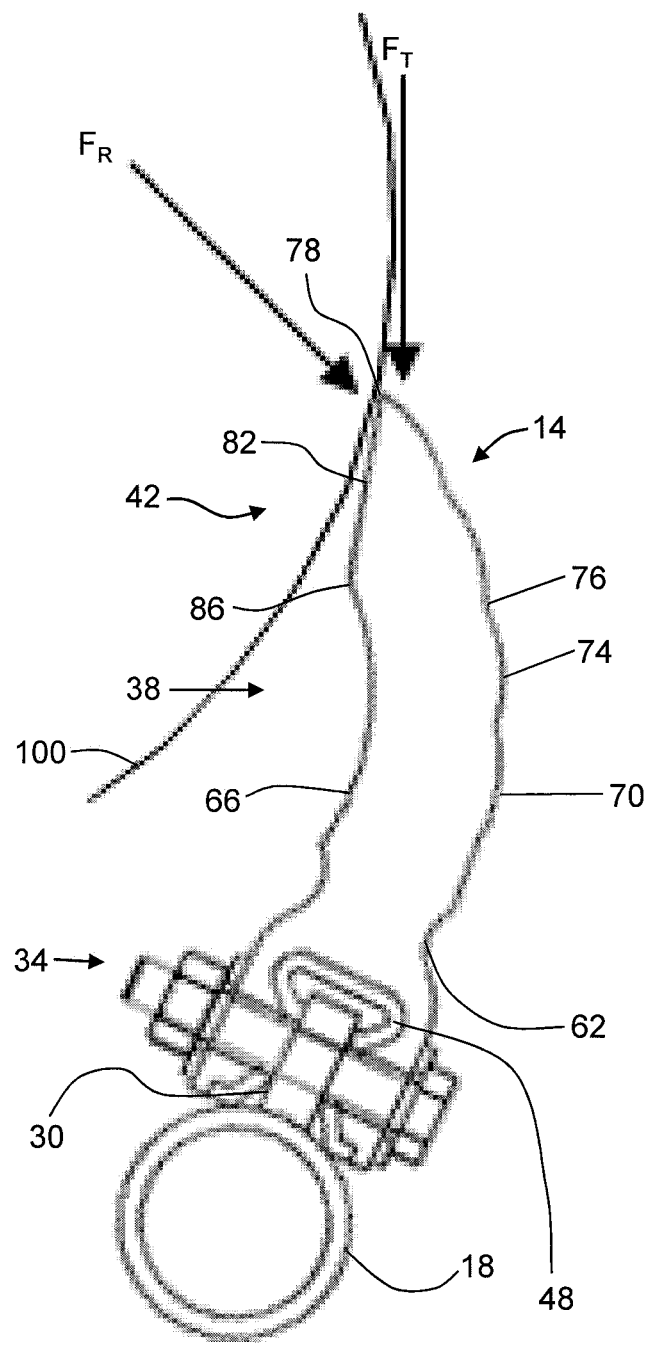
FIG. 13 is a side view of a scraper blade of the present invention illustration operational forces acting on the blade.
Figure 14:
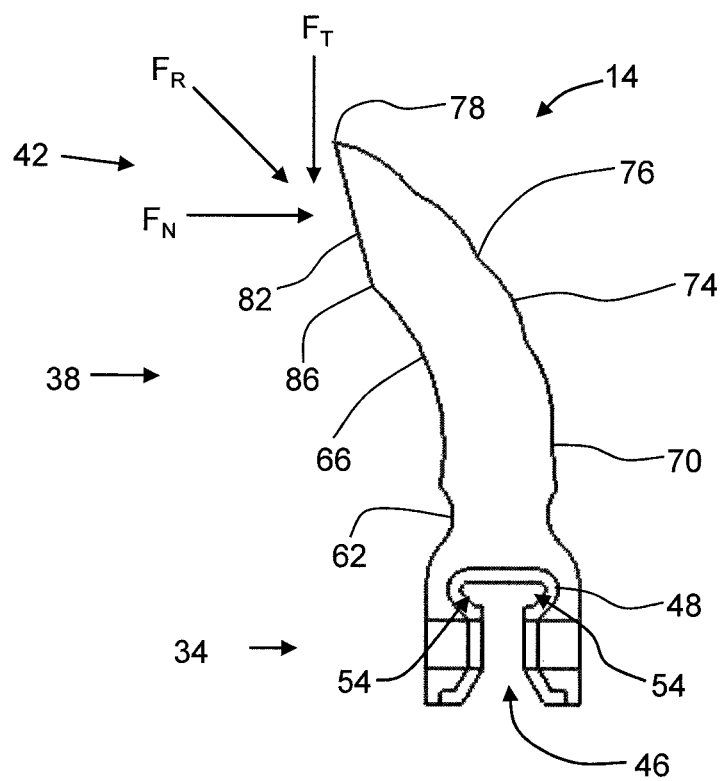
FIG. 14 is a side view of a scraper blade of the present invention showing forces acting on the blade.
Figure 15:
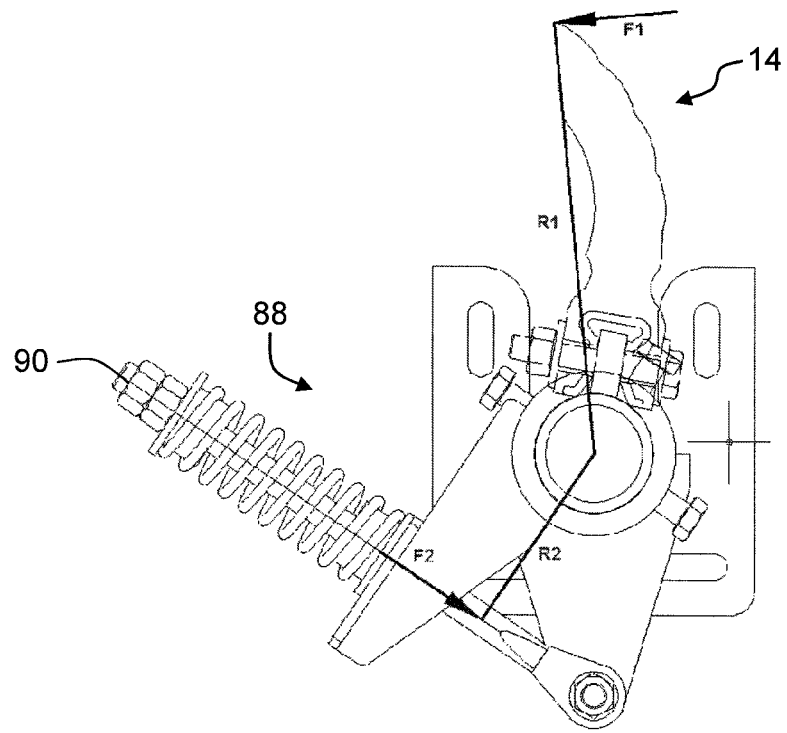
FIG. 15 is a side view of a conveyor belt cleaning assembly illustrating tensioning setting operation.

FIGS. 13-15 illustrate the forces acting the blade 14 and a means for adjusting the force using an existing tensioning device 88. A resultant force $F_R$ is the product of a force $F_M$ provided by the carry-over material on the belt 100 and a normal force $F_N$ provided by a setting $F_2$ variable by adjusting a spring-loaded nut 90 on the existing tensioner 88. Thus, the magnitude and direction of the resultant force $F_R$ vector can be varied by a control on the tensioner 88 to optimize performance of the blade 14.

Figure 16:
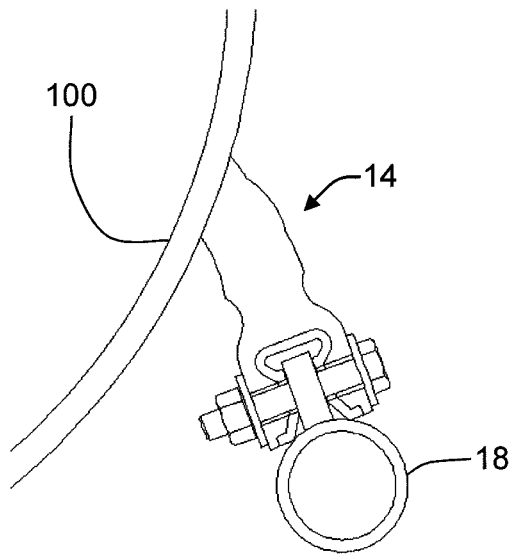
FIG. 16 and FIG. 17 are side view of a belt cleaning assembly showing a scraper blade in service and a result of an exhausted or spent scraper blade, respectively.
Figure 17:
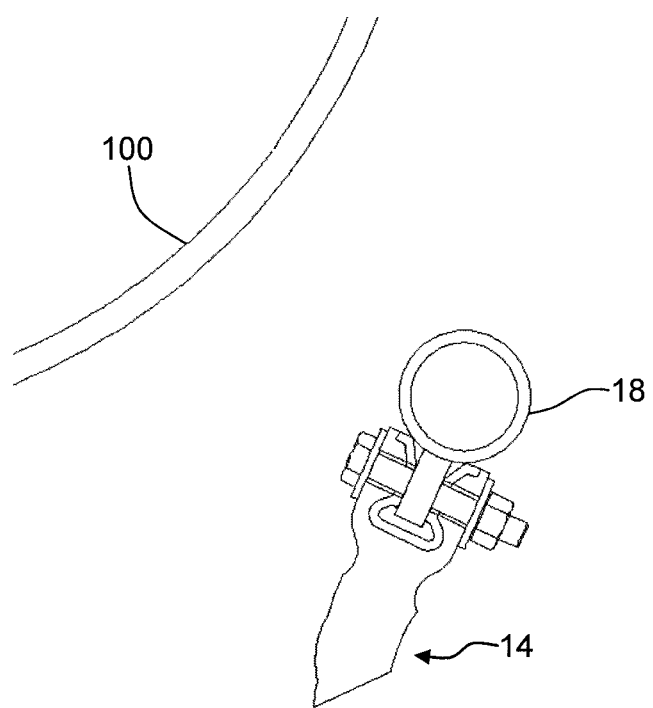

The tensioner 22 is provided for, among other things, supporting the shaft 18, biasing the blade 14 against the conveyor belt 100 (counterclockwise in the embodiment illustrated in FIGS. 1-7), and adjusting the force and angle with which a scraping surface 82 strikes or engages the belt 100. Once the blade 14 is spent, the tensioner 22 rotates the spent blade 14 through a contact zone with the belt 100 to a position such that the blade 18 is spaced from any contact with the belt 100 as illustrated in FIGS. 15 and 16.

The terms "first," "second," "upper," "lower," "top," "bottom," etc., when used, are for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and/or "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While the specific embodiments have been illustrated and described, numerous modifications come to mind without significantly departing from the spirit of the invention, and the scope of protection is only limited by the scope of the accompanying Claims.

What is claimed is:

1. A replaceable conveyor scraping blade comprising:
a unitary blade body extending lengthwise along a longitudinal axis and produced from a material having a flexible, elastic quality comprising:
  a base portion attachable to a tensioning device for biasing the blade body against a conveyor belt;
  a generally arcuate intermediate portion comprising a first surface extending upwardly relative to the base portion, and a second surface opposite the first surface, also extending upwardly relative to the base portion, and having a scalloped surface when viewed in cross-section taken transverse to the longitudinal axis and extending lengthwise along the longitudinal axis wherein the scalloped surface comprises a plurality of alternating convex and concave sub-surfaces, wherein a scraping surface is formed between the first and second surfaces having a variable contact angle, and wherein the alternating convex and concave surfaces provide a variable contact area which smoothens out peaks and valleys of a mechanical pressure application by providing slight variations in the contact area during blade wear; and
  a terminal end having a scraping surface separating an uppermost portion of the second surface from an uppermost portion of the first surface.

2. The replaceable conveyor scraping blade of claim 1 wherein the uppermost portion of the second surface is higher than the uppermost portion of the first surface relative to the base portion.

3. The replaceable conveyor scraping blade of claim 1 wherein each convex sub-surface extends lengthwise along the longitudinal axis.

4. The replaceable conveyor scraping blade of claim 3 wherein each concave sub-surface extends lengthwise along the longitudinal axis.

5. The replaceable conveyor scraping blade of claim 4 wherein each concave sub-surface is separated from an adjacent concave sub-surface by at least one of the convex sub-surfaces.

6. The replaceable conveyor scraping blade of claim 5 wherein the first surface is arcuately shaped.

7. The replaceable conveyor scraping blade of claim 6 wherein the scraping surface is angled greater than 0° from a vertical axis passing through an edge at which the scraping surface and the second surface intersect.

8. The replaceable conveyor scraping blade of claim 7 wherein the intermediate portion further comprises a neck having a reduced width to provide a region of reduced resistance to deflection for allowing the terminal end and the intermediate portion to deflect about the base portion.

9. The replaceable conveyor scraping blade of claim 8 wherein the base portion comprises a slot extending along the longitudinal axis for mounting the replaceable conveyor scraping blade to the tensioning device.

10. The replaceable conveyor scraping blade of claim 9 wherein the slot is lined with a rigid member.

11. The replaceable conveyor scraping blade of claim 10 wherein the slot has a pair of opposing openings forming a substantially T-shaped cross-section.

12. The replaceable conveyor scraping blade of claim 1 wherein the scalloped surface comprises a visual level of wear indicator.

13. The replaceable conveyor scraping blade of claim 1 wherein the first surface is a leading surface extending arcuately and upwardly from the base portion to the terminal end, and the second surface is a trailing surface extending upwardly and arcuately from the base portion to the terminal end.

14. The replaceable conveyor scraping blade of claim 1 wherein each of the convex and concave sub-surfaces are arcuately shaped.

15. A replaceable conveyor scraping blade comprising:
a unitary blade body extending lengthwise along a longitudinal axis and produced from a material having a flexible, elastic quality comprising:
  a base portion attachable to a tensioning device for biasing the blade body against a conveyor belt;
  a generally arcuate intermediate portion comprising a first surface extending upwardly relative to the base portion, and a generally arcuate second surface opposite the first surface, also extending upwardly relative to the base portion, and having a plurality of alternating outwardly convex surfaces and inwardly concave surfaces extending lengthwise along the longitudinal axis, each outwardly convex surface separated from an adjacent outwardly convex surface by an inwardly concave surface forming a scalloped surface when viewed in a cross-section taken transverse to the longitudinal axis, wherein the alternating convex and concave surfaces provide a variable contact area which smoothens out peaks and valleys of a mechanical pressure application by providing slight variations in the contact area during blade wear; and
  a terminal end having a scraping surface separating an uppermost portion of the second surface from an uppermost portion of the first surface.

16. The replaceable conveyor scraping blade of claim 15 wherein the uppermost portion of the second surface is higher than the uppermost portion of the first surface relative to the base portion.

17. The replaceable conveyor scraping blade of claim 16 wherein the intermediate portion further comprises a neck having a reduced width to provide a region of reduced resistance to deflection for allowing the terminal end and the intermediate portion to deflect about the base portion.

18. The replaceable conveyor scraping blade of claim 15 wherein the first surface is arcuately shaped.

19. The replaceable conveyor scraping blade of claim 15 wherein the first surface is a leading surface extending arcuately and upwardly from the base portion to the terminal end, and the second surface is a trailing surface extending upwardly and arcuately from the base portion to the terminal end.

20. The replaceable conveyor scraping blade of claim 15 wherein each of the outwardly convex and inwardly concave surfaces are arcuately shaped.

* * * * *